United States Patent
Gosa

[11] Patent Number: 5,813,205
[45] Date of Patent: Sep. 29, 1998

[54] GUIDE ASSEMBLY FOR DISAPPEARING FINGERS

[75] Inventor: Duane Junior Gosa, Green Rock, Ill.

[73] Assignee: Deere & Company, Moline, Ill.

[21] Appl. No.: 799,851

[22] Filed: Feb. 13, 1997

[51] Int. Cl.$^6$ .................................................. A01D 43/02
[52] U.S. Cl. ............................................. 56/364; 56/341
[58] Field of Search .............................. 56/344, 351, 350, 56/358, 341, 364, 432; 172/21, 22

[56] References Cited

U.S. PATENT DOCUMENTS

| | | | |
|---|---|---|---|
| 327,713 | 10/1885 | Nelson | 172/22 |
| 2,845,884 | 8/1958 | Clausing et al. | 172/21 |
| 3,218,788 | 11/1965 | Hubbard | 56/341 |
| 3,236,038 | 2/1966 | Gates et al. | 56/364 |
| 3,924,391 | 12/1975 | Cheatum | 56/364 |
| 3,934,390 | 1/1976 | Ballard | 172/21 |
| 4,182,102 | 1/1980 | Anderson et al. | 56/344 |
| 4,479,347 | 10/1984 | Larsen et al. | 56/344 |
| 4,539,801 | 9/1985 | Field | 56/364 |
| 4,574,815 | 3/1986 | West et al. | |
| 4,597,252 | 7/1986 | Williames | 56/364 |
| 5,052,171 | 10/1991 | Bich et al. | 56/364 |
| 5,247,785 | 9/1993 | Wolf | 56/350 |
| 5,394,682 | 3/1995 | Frimml et al. | 56/341 |
| 5,426,928 | 6/1995 | Frimml et al. | 56/341 |
| 5,620,083 | 4/1997 | Vogelesang | 56/364 |

FOREIGN PATENT DOCUMENTS 641179  8/1950  United Kingdom ..................... 172/21

OTHER PUBLICATIONS

Parts Catalog Combine, Hillside, 95H, (Nov. 1968) p. 216.

*Primary Examiner*—Michael J. Carone
*Assistant Examiner*—Fredrick T. French, III

[57] ABSTRACT

The present invention comprises a guide assembly for disappearing fingers that is bolted to the auger tube by mounting bolts. The guide assembly is provided with an inwardly projecting sleeve that is provided with two swivel assemblies, one on either side of the sleeve. The sleeve permits the disappearing finger to be retracted into the auger tube below the interior surface of the tube. In the preferred embodiment the swivel assemblies of the sleeve are sandwiched between a first plastic member and a metal second member. This embodiment is bolted to the exterior surface of the auger tube. In an alternate embodiment, the swivel assemblies of the sleeve are engaged by a clamping bracket that is bolted to the interior surface of the auger tube.

15 Claims, 3 Drawing Sheets

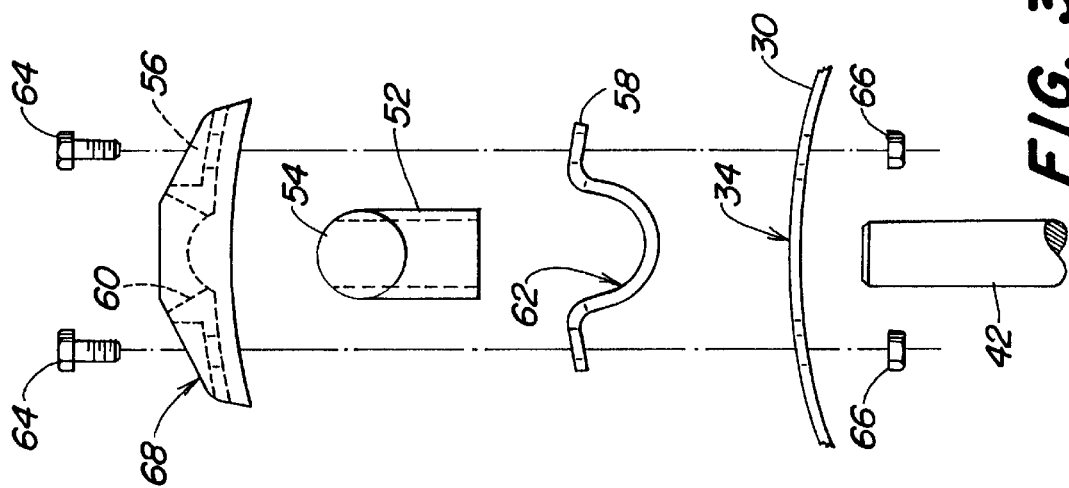
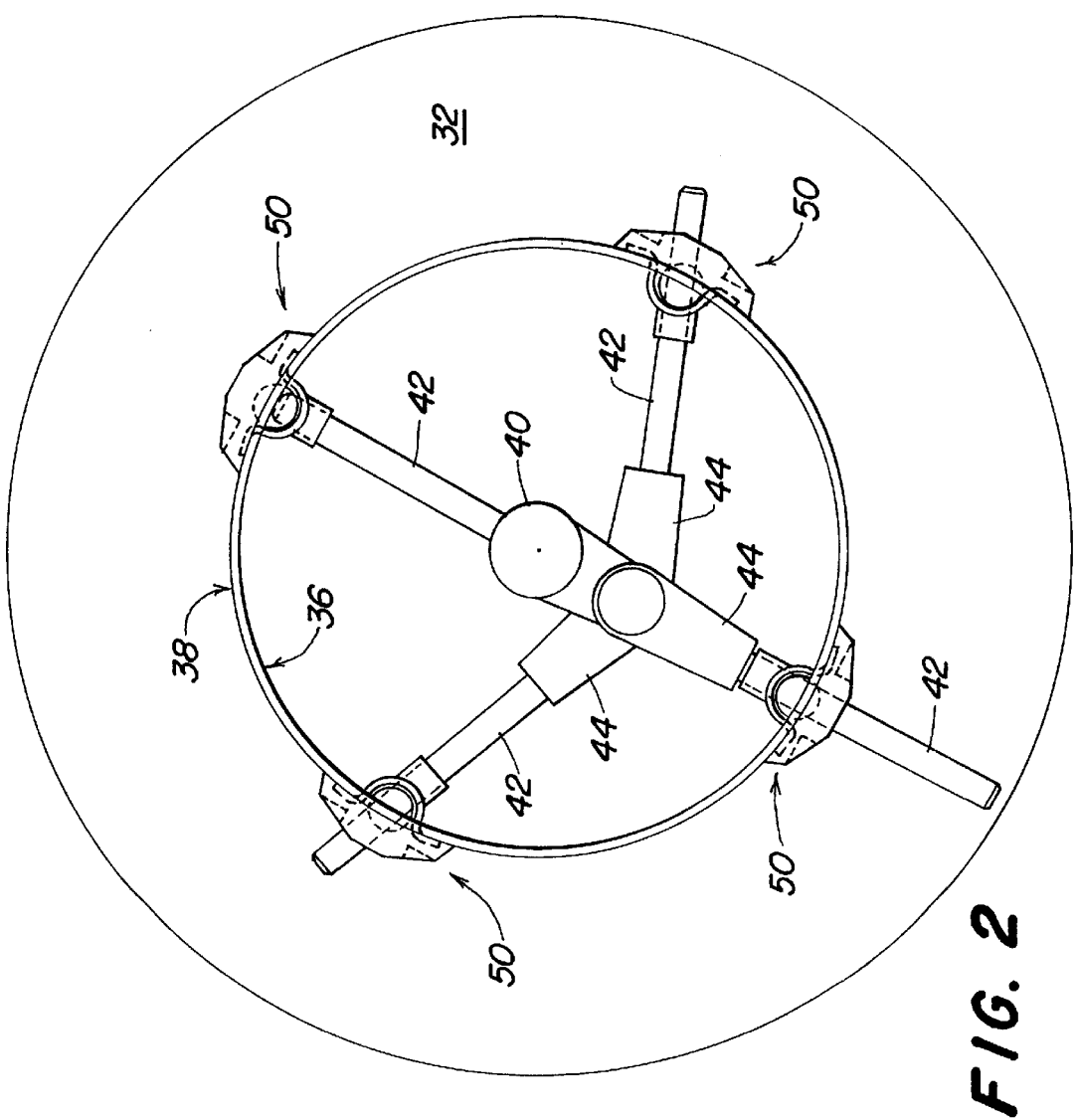

# GUIDE ASSEMBLY FOR DISAPPEARING FINGERS

BACKGROUND OF THE INVENTION

1. Field of the Invention

The invention is directed to an assembly for guiding the disappearing fingers of the auger tube on a harvesting platform.

2. Description of the Prior Art

Harvesting platforms are used to cut an agricultural crop and direct the cut crop to the feederhouse of a combine. The platform is provided with a supporting frame which is provided with a cutter for cutting the crop. The cutter can be a reciprocating cutter bar, rotary cutters or other mechanisms for cutting the crop. The cut crop falls on the floor of the harvesting platform and is concentrated by a transversely extending auger. The auger is provided with a first portion having helical flighting and a second portion without flighting. The second portion is provided with a plurality of apertures through which disappearing fingers project. The disappearing fingers engage the crop and propel it through an opening in the supporting structure into the inlet for the feederhouse.

The disappearing fingers are on an offset shaft located inside the auger tube. As the tube and fingers rotate, the fingers move radially inward and outward from the tube to engage or disengage from the cut crop. In the past, guides for the disappearing fingers have been formed by spherically shaped pivot blocks having cylindrical apertures. These guide blocks have been mounted between two clamping plates. The clamping plates are mounted to the tube and the spherical pivot block forms a guide for the fingers. There are also stationary guides that are used to contain the fingers.

SUMMARY

It is important that the tips of the disappearing fingers retract below the surface of the auger tube to get an optimum finger pattern to convey crop material smoothly into the feederhouse when using larger sized auger tubes.

It is an object of the present invention to provide a guide having an inwardly extending sleeve so that the tip of the disappearing fingers can be retracted below the interior surface of the auger tube.

The present invention comprises a guide assembly that is bolted to the auger tube by mounting bolts. The guide assembly is provided with an inwardly projecting sleeve that is provided with two swivel assemblies. One on either side of the sleeve. In the preferred embodiment the swivel assemblies of the sleeve are sandwiched between a first plastic member and a metal second member. This embodiment is bolted to the exterior surface of the auger tube. In an alternate embodiment, the swivel assemblies of the sleeve are engaged by a clamping bracket that is bolted to the interior surface of the auger tube.

BRIEF DESCRIPTION OF THE DRAWINGS

FIG. 2 is a close up side view of the auger and disappearing fingers.

FIG. 3 is an exploded view of the preferred embodiment.

DETAILED DESCRIPTION

Figure 1:
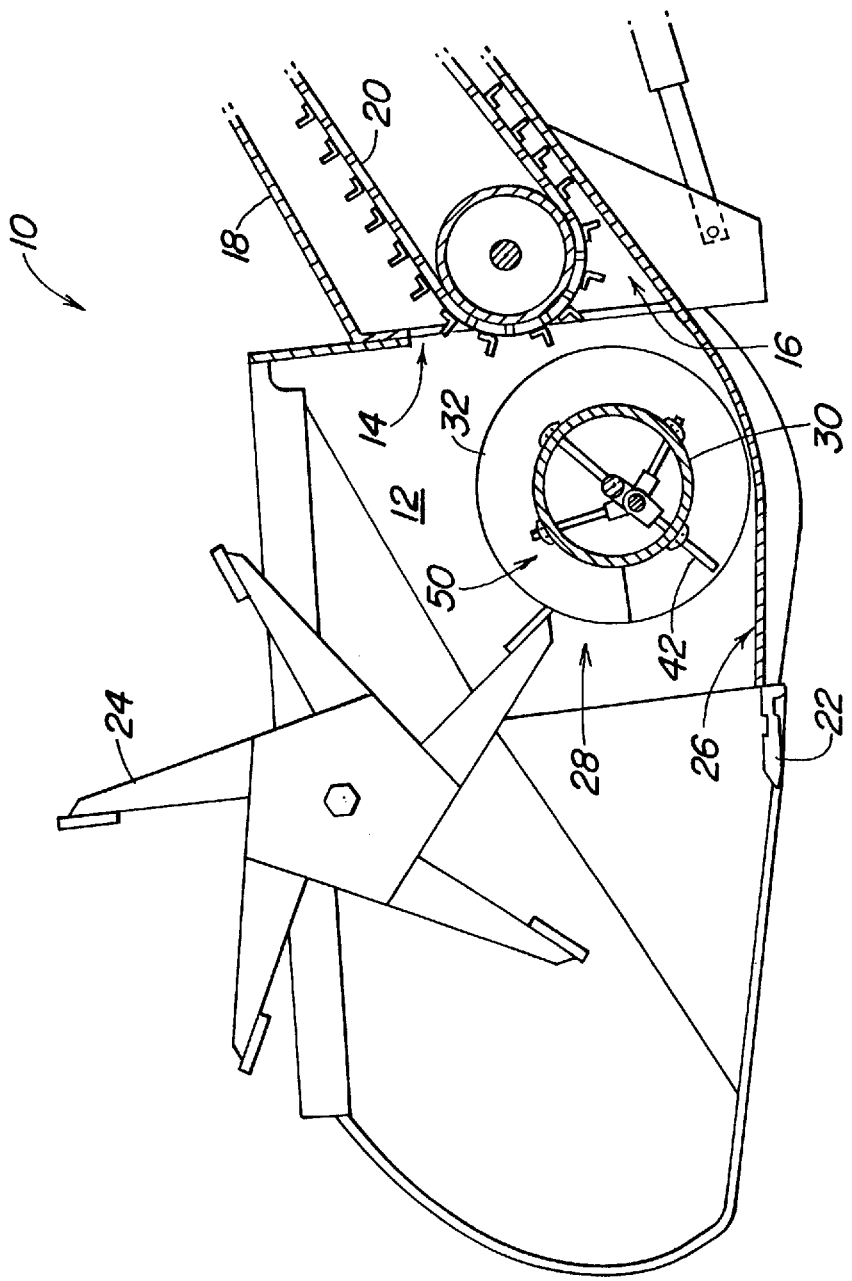
FIG. 1 is a cross sectional side view of a harvesting platform.

Harvesting platform 10 is provided with a supporting structure 12 having an outlet 14. The outlet 14 corresponds to the inlet 16 of the feederhouse 18. The feederhouse is provided with a conveyor 20 for directing the cut crop to the combine. The forward edge of the supporting structure 12 is provided with a cutter 22. In the illustrated platform the cutter is a relatively conventional reciprocating cutterbar. As the platform is moved through the field the top of the crop is engaged by a rotating reel 24. The stalks are cut by the cutter 22 and the cut crop falls on the floor 26 of the supporting structure. A transversely extending auger 28 draws the cut crop on the floor 26 to the center of the platform where it is propelled though outlet 14 into feederhouse 18.

The auger 28 comprises a hollow tube 30 having a first portion that is provided with helical flighting 32 and a second portion that is provided with apertures 34. The tube 30 has an interior surface 36 and an exterior surface 38. Located in the auger tube is a crankshaft 40 having a plurality of disappearing fingers 42 attached thereto by mounting assemblies 44. The disappearing fingers extend and retract through the apertures of the auger tube. The fingers extend and engage the concentrated cut crop material located on the floor of the platform and propel it rearwardly through the outlet 14 into the feederhouse 18. The fingers retract and disengage from the crop after imparting this propulsion force.

Each of the apertures in the auger tube is provided with a guide assembly 50. In the preferred embodiment illustrated in FIGS. 1–3, the guide assembly 50 comprises a sleeve 52 that extends inwardly into the auger tube. The sleeve 52 is provided with two swivel assemblies 54 which comprise cylindrical protuberances extending on opposite sides of the sleeve 52. The swivel assemblies 54 are sandwiched between a first member 56 and a second member 58. The first and second members 56 and 58 are provided with elongated slots 60 and 62, respectively, which permit the eccentric movement of the disappearing fingers. The guide assembly is mounted to the exterior of the auger tube by mounting bolts 64 and associated nuts 66. With this embodiment, the rotational axis of the swivel assemblies is very close if not intersecting the auger tube wall.

The first member is provided with an exterior surface 68. As the auger tube turns the finger is retracted by the crank, the tip of the finger first retracts past the exterior surface. The finger would be further retracted so that its tip is below the interior surface of the auger tube.

Figure 4:
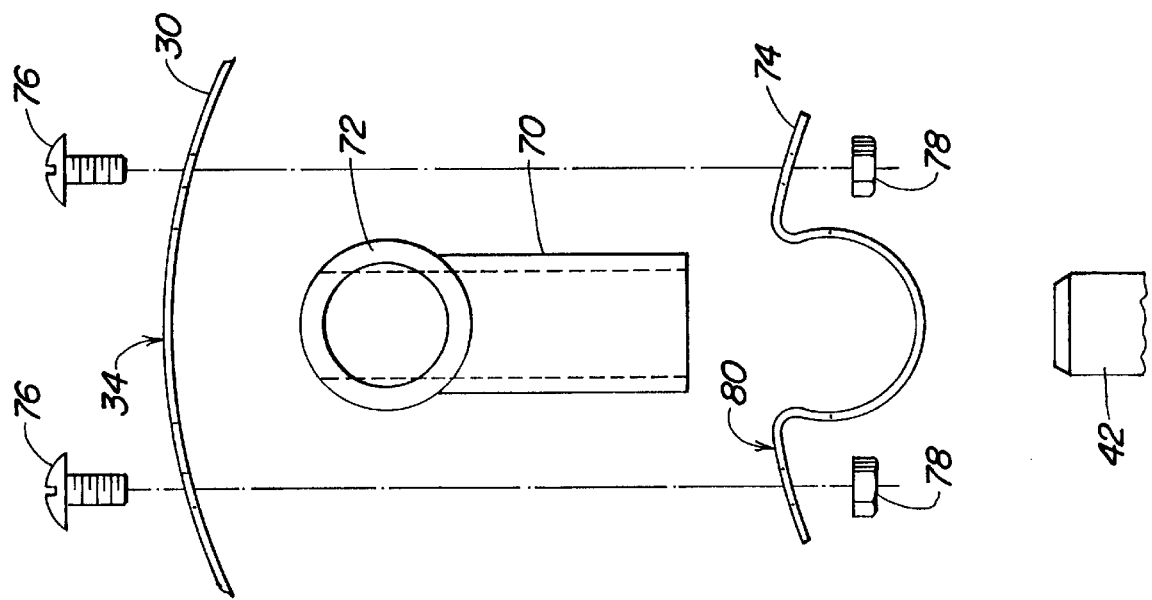
FIG. 4 is an exploded view of the alternate embodiment.

In the alternate embodiment illustrated in FIG. 4, The sleeve 70 again projects into the auger tube. The sleeve is provided with two swivel assemblies 72 comprising two cylindrical protuberances. A clamping bracket 74 is bolted to the interior surface of the auger tube by mounting bolts 76 and associated nuts 78. The clamping bracket pivotally anchoring the sleeve to the tube. In this embodiment, the swivel axis is located below the interior surface of the auger tube.

Like the preferred embodiment, this embodiment is also provided with an exterior surface 80. As the finger is retracted by the crank, the tip of the finger retracts past the exterior surface 80 which corresponds to the interior surface of the auger tube.

The present invention should not be limited to the above described embodiments, but should be limited solely by the claims that follow.

I claim:

1. A harvesting platform for harvesting an agricultural crop, the platform comprising:

a supporting frame having an outlet;

a cutter being mounted to the supporting frame for cutting the agricultural crop;

an auger being rotatively mounted to the frame for concentrating the agricultural crop cut by the cutter, the auger is provided with a cylindrical tube and helical flighting being mounted to a first portion of the tube, a second portion of the tube is provided with apertures;

a plurality of disappearing fingers being mounted in the second portion of the tube, each of the disappearing fingers being provided with a tip for engaging the agricultural crop concentrated by the auger and propelling the agricultural crop through the outlet in the supporting structure;

each aperture of the second portion of the tube is provided with a guide assembly having an exterior surface, each guide assembly being provided with a sleeve for receiving a disappearing finger and functioning as a guide for the finger so that the tip can be completely recessed into the guide assembly inward from the exterior surface wherein the each sleeve being pivotally coupled to its respective guide assembly.

2. A harvesting platform as defined by claim 1 wherein each sleeve is provided with swivel assemblies for pivotally coupling the sleeve to the guide assembly.

3. A harvesting platform as defined by claim 2 wherein the second portion of the tube of the auger has an exterior surface and an interior surface.

4. A harvesting platform as defined by claim 3 wherein the guide assembly is mounted to the exterior surface of the second portion of the tube by mounting bolts.

5. A harvesting platform as defined by claim 4 wherein the guide assembly further comprises a first member and a second member and the swivel assemblies of the sleeve are sandwiched between the first and second members of the guide assembly.

6. A harvesting platform as defined by claim 5 wherein the tips of the disappearing fingers can be retracted into the tube inward from the interior surface.

7. A harvesting platform as defined by claim 6 wherein the sleeve and the first member are plastic and the second member is metal.

8. A harvesting platform as defined by claim 3 wherein the guide assembly being mounted to the interior surface of the second portion of the tube by mounting bolts.

9. A harvesting platform as defined by claim 8 wherein the guide assembly further comprises a clamping bracket that engages the swivel assemblies of the sleeve.

10. A harvesting platform as defined by claim 9 wherein the tips of the disappearing fingers can be retracted into the tube inward from the interior surface.

11. An arrangement for guiding disappearing fingers of a harvesting platform auger tube, wherein the auger tube has an exterior surface and an interior surface, the tube being provided with a plurality of apertures for receiving the disappearing fingers, the arrangement comprising:

a sleeve extending into the tube of the auger at each aperture for receiving a disappearing finger, the sleeve having swivel assemblies;

a first member and a second member which are sandwiched around the swivel assemblies of the sleeve, the first and second members being mounted to the exterior surface of the tube by mounting bolts.

12. An arrangement as defined by claim 11 wherein the tips of the disappearing fingers can be retracted into the tube inward from the interior surface.

13. A harvesting platform as defined by claim 12 wherein the sleeve and the first member are plastic and the second member is metal.

14. An arrangement for guiding disappearing fingers of a harvesting platform auger tube, wherein the auger tube has an exterior surface and an interior surface, the tube being provided with a plurality of apertures for receiving the disappearing fingers, the arrangement comprising:

a sleeve extending into the tube of the auger at each aperture for receiving a disappearing finger, the sleeve having swivel assemblies;

a clamping bracket engaging the swivel assemblies of the sleeve, the clamping bracket being mounted to the interior surface of the tube by mounting bolts.

15. An arrangement as defined by claim 14 wherein the tips of the disappearing fingers can be retracted into the tube inward from the interior surface.

* * * * *